United States Patent [19]

Ogawa

[11] Patent Number: 5,917,991
[45] Date of Patent: Jun. 29, 1999

[54] VIDEO RECORDING CAMERA

[75] Inventor: Masahiko Ogawa, Tokyo, Japan

[73] Assignee: Canon Kabushiki Kaisha, Tokyo, Japan

[21] Appl. No.: 08/470,689

[22] Filed: Jun. 6, 1995

Related U.S. Application Data

[62] Division of application No. 08/350,747, Dec. 7, 1994, Pat. No. 5,802,247, which is a continuation of application No. 08/029,344, Mar. 8, 1993, abandoned, which is a continuation of application No. 07/844,947, Mar. 2, 1992, abandoned, which is a continuation of application No. 07/512,545, Apr. 18, 1990, abandoned, which is a continuation of application No. 07/107,843, Oct. 6, 1987, abandoned, which is a continuation of application No. 06/656,173, Sep. 28, 1984, abandoned.

[30] Foreign Application Priority Data

| Oct. 5, 1983 | [JP] | Japan | 58-154683 |
| Oct. 5, 1983 | [JP] | Japan | 58-154684 |

[51] Int. Cl.⁶ .................................................. H04N 5/225
[52] U.S. Cl. ........................... 386/117; 386/119; 348/211
[58] Field of Search ................................ 360/33.1, 35.1, 360/71, 74.1, 60; 358/310, 335; 354/238.1; 348/211, 213; 386/119, 117

[56] References Cited

U.S. PATENT DOCUMENTS

| 4,272,176 | 6/1981 | Maitani et al. | 354/288 |
| 4,295,724 | 10/1981 | Sahara et al. | 354/238 |
| 4,366,501 | 12/1982 | Tsunekawa et al. | 358/310 |
| 4,456,931 | 6/1984 | Toyoda et al. | 358/335 |
| 4,531,164 | 7/1985 | Maeda et al. | 360/33.1 |
| 4,544,959 | 10/1985 | Kozuki et al. | 360/33.1 |
| 4,570,188 | 2/1986 | Ichiyanagi | 358/335 |
| 4,783,707 | 11/1988 | Nemoto et al. | 360/105 |

FOREIGN PATENT DOCUMENTS

| 0140507 | 10/1979 | Japan . |
| 0150282 | 9/1982 | Japan . |
| 59-10077 | 1/1984 | Japan . |

*Primary Examiner*—Andrew L. Sniezek
*Attorney, Agent, or Firm*—Anderson, Kill & Olick, P.C.

[57] ABSTRACT

A video recording camera comprises image pick-up apparatus; recording apparatus including at least one recording head for recording on a record bearing medium an image signal obtained by the image pick-up apparatus, recording control apparatus for controlling the recording action of the recording apparatus, driving apparatus for driving the record bearing medium and the recording head relative to each other for recording the image signal; trigger apparatus, and timer apparatus responsive to the trigger apparatus for producing a control signal for actuating the driving apparatus after the lapse of a first predetermined period of time and producing a recording instruction signal at the recording control apparatus after the lapse of a second predetermined period of time which ensues after the first period of time.

4 Claims, 2 Drawing Sheets

VIDEO RECORDING CAMERA

This is a divisional application of Ser. No. 08/350,747, filed Dec. 7, 1994, U.S. Pat. No. 5,802,247, which is a continuation application of Ser. No. 08/029,344, filed Mar. 8, 1993, abandoned, which in turn is a continuation application of Ser. No. 07/844,947, filed Mar. 2, 1992, which is abandoned, which in turn is a continuation application of Ser. No. 07/512,545, filed Apr. 18, 1990, which is abandoned, which in turn is a continuation application of Ser. No. 07/107,843, filed Oct. 6, 1987, which is abandoned, which in turn is a continuation application of Ser. No. 06/656,173, filed Sep. 28, 1984, which is abandoned.

BACKGROUND OF THE INVENTION

1. Field of the Invention

This invention relates to a camera and more particularly to a video recording camera having means for recording an image signal on a record bearing medium.

2. Description of the Prior Art

The self-timer photographing device used for a film type camera is very convenient. Today almost every film type camera is equipped with a self-timer photography device.

It is certain, in view of the above-stated background, the demands for self-timer devices for video recording cameras will become greater.

However, application of the self-timer device of the film-type camera, to a video recording camera as it presently is, brings about the following problems: The self-timer device of the film-type camera is arranged to allow various photographing devices of the camera to begin to operate after waiting a predetermined period of time, say, 10 seconds or thereabouts. If this arrangement is applied as it is to the video recording camera to operate the devices and the circuits for image pick-up and signal recording after waiting a predetermined period of time, the camera would fail to appositely perform video recording, because the video camera includes some elements requiring a relatively long period of time called a rise time after their start before they reach their respective stable operating states. An example is the driving means which drives a record bearing medium and a recording head relative to each other. This problem may be solved by having the devices and the circuits for image pick-up and signal recording begin to operate concurrently with the start of the self-timer device and to have recording performed by applying to the recording means a control signal which instructs the recording means to record upon the lapse of the above waiting period of time. However, this arrangement increases power consumption and is very inconvenient, particularly for a video recording camera of the kind having a limited capacity power supply.

Furthermore, for a camera equipped with a self-timer device, it is advantageous to provide some arrangement to inform the camera operator of the lapsing status of a photographing delay time set by the self-timer device. It is also convenient, particularly for a person or persons to be photographed, to have some informing means that alters its informing manner to a different informing manner immediately before photographing.

It is therefore a principal object of the present invention to provide a video recording camera having a novel self-timer device which is capable of deleting the above-stated inconveniences.

It is another object of the invention to provide a video recording camera equipped with a self-timer device which is capable of reducing power consumption.

It is a further object of the invention to provide a video recording camera having a novel self-timer device, wherein video recording can always be appositely carried out with low power consumption and annunciating means provides annunciation based on the controlled status of a photography delay time under the control of a self-timer device.

These and other objects and features of the invention will become apparent from the following description of embodiments thereof taken in conjunction with the accompanying drawings.

SUMMARY OF THE INVENTION

To attain the first two objects of the invention, a video recording camera embodying an aspect of the present invention comprises image pick-up means, recording means including at least one recording head for recording on a record bearing medium an image signal obtained by the image pick-up means, recording control means for controlling the recording action of the recording means, driving means for driving the record bearing medium and the recording head relative to each other for recording the image signal, trigger means, and timer means responsive to the trigger means for producing a control signal for actuating the driving means after the lapse of a first predetermined period of time and producing a recording instruction signal to the recording control means after the lapse of a second predetermined period of time ensuing after the first period of time.

To accomplish the third object of the invention, a video recording camera embodying another aspect of the invention comprises image pick-up means, recording means including at least one recording head for recording on a record bearing medium an image signal obtained by the image pick-up means, recording control means for controlling the recording action of the recording means, driving means for driving the record bearing medium and the recording head relative to each other for recording the image signal, trigger means, timer means responsive to the trigger means for producing a control signal for actuating the driving means after the lapse of a first predetermined period of time and producing a recording instruction signal to the recording control means after the lapse of a second predetermined period of time ensuing after the first period of time, and annunciating means which, when the timer means operates, announces in a first mode during the process of the above-stated first period of time and in a second mode during the process of the second period of time. The second mode differs from the first mode.

BRIEF DESCRIPTION OF THE DRAWINGS

Preferred embodiments which will be described in the following are arranged as shown in the accompanying drawings, in which.

DETAILED DESCRIPTION OF THE PREFERRED EMBODIMENTS

Figure 1:
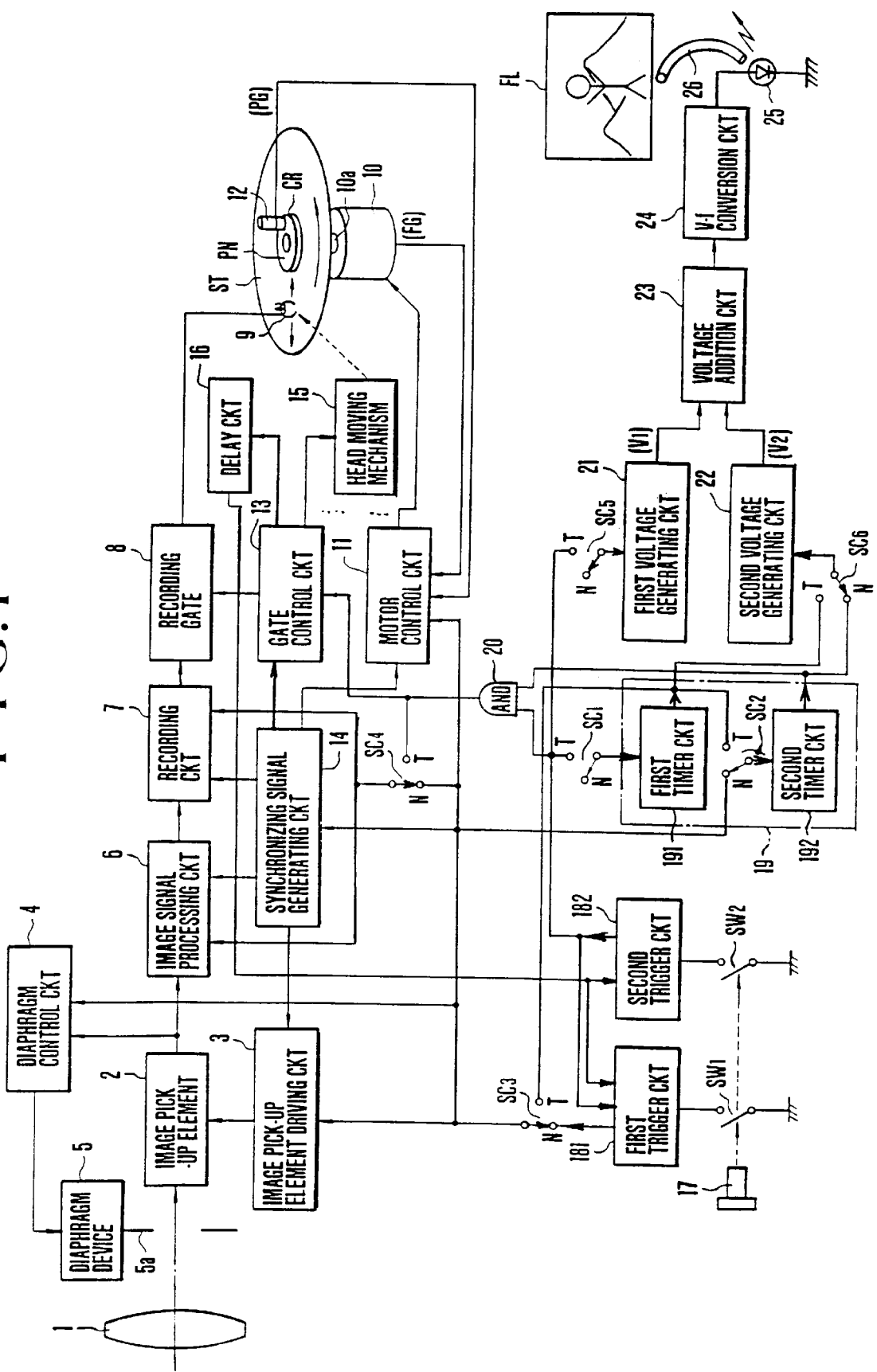
FIG. 1 is a circuit block diagram showing a video recording camera arranged in an embodiment of the present invention and particularly the electric circuit system arrangement.

Referring to FIG. 1, reference numeral 1 identifies an image pick-up optical system. A two-dimensional solid-state image pick-up element 2 such as a CCD, BBD or MOS image sensor has the light receiving surface thereof located on a predetermined focal plane. An image pick-up element driving circuit 3 drives the image pick-up element 2. These elements 2 and 3 jointly form image pick-up means. A known diaphragm control circuit 4 controls a diaphragm device 5 which is disposed in front of the light receiving surface of the image pick-up element 2 and which adjusts the quantity of light incident on the light receiving surface to an apposite light quantity on the basis of the brightness component of an image signal obtained by the image pick-up element 2. The diaphragm device 5 is provided with diaphragm blades 5a. A known image signal processing circuit 6 processes the image signal obtained from the image pick-up element 2 to detect the brightness component thereof, performing color separation and forming color difference signals. A known recording circuit 7 converts the signal output of the image signal processing circuit 6 into a recording signal by adding a synchronizing signal thereto and by carrying out a frequency modulating action thereon. A recording gate 8 performs a gate action on some portion of the signal output of the recording circuit 7 that is to be recorded. A magnetic head 9 magnetically records the recording signal coming from the recording gate 8 on a magnetic sheet or disc ST which is employed as a record bearing medium. These elements 7, 8 and 9 form recording means.

A motor 10 rotates the magnetic sheet ST. A motor control circuit 11 controls the motor 10. The motor 10 and the motor control circuit 11 form driving means. The magnetic sheet ST is provided with a center core CR at its middle. The sheet ST is mounted on the rotating shaft 10a of the motor 10 at this center core CR. The center core CR has an index pin PN which is disposed on the center core CR and indicates the rotation phase of the magnetic sheet ST. A rotation phase detecting member 12 detects the index pin PN and produces a rotation phase detection signal PG which is supplied to the motor control circuit 11 together with a rotation speed signal FG which represents the rotating speed of the motor 10. A one-shot type gate control circuit 13 forms, in conjunction with an AND circuit 20, recording control means for controlling the above-stated recording gate 8. A synchronizing signal generating circuit 14 generates various synchronizing signals in a known manner. Some of the synchronizing signals generated by the circuit 14 serve as reference timing signals which are supplied to the image pick-up element driving circuit 3 to be used as the reference in driving the image pick-up element 2; a part of the synchronizing signals serves as a reference timing signal and vertical and horizontal synchronizing signals which are supplied to the image signal processing circuit 6 and the recording circuit 7 to be used in performing signal processing and signal converting operations; another part of the synchronizing signals is supplied as a reference timing signal to the gate control circuit 13 to be used in causing the recording gate 8 to perform the gate action on the recording signal; and a further part of the synchronizing signals is supplied to the motor control circuit 11 as a reference timing signal to cause the motor 10 to rotate the magnetic sheet ST. In this instance, the synchronizing signal generating circuit 14 supplies a vertical synchronizing signal to the motor control circuit 11. Then, the motor control circuit 11 controls the motor 10 on the basis of the vertical synchronizing signal received from the circuit 14, the rotation phase detection signal PG from the detecting member 12 and the rotation speed signal FG from the motor in such a manner that the motor 10 rotates the magnetic sheet ST at a predetermined phase and at a predetermined speed which corresponds to the field or frame frequency of television and is, for example, 3,600 rpm or 1,800 rpm in [the case of] the NTSC television system. The synchronizing signal generating circuit 14 supplies the gate control circuit 13 with horizontal and vertical synchronizing signals. Then, the gate control circuit 13 controls the recording gate 8 on the basis of the horizontal and vertical synchronizing signals and a recording instruction signal coming from the AND gate circuit 20, as will be described later herein, in such a manner that: The recording gate 8 performs a gate action on one field or one frame portion of the recording signal output of the recording circuit 7 including horizontal and vertical synchronizing signals, applying that portion of the recording signal to the magnetic head 9 every time the recording instruction signal is received. Under this control, one field or one frame portion of a video signal is recorded on the magnetic sheet ST through the magnetic head 9.

A head moving mechanism 15 moves the magnetic head 9 a predetermined amount, for example, one track pitch, at a time in the radial direction of the magnetic sheet ST in response to a signal of the gate control circuit 13 indicative of either an end of recording or recording in process. With the head moving mechanism 15 arranged in this manner, the one-field or -frame portion of the video signal is recorded on the magnetic sheet ST in each of the recording tracks thus concentrically or helically formed on the magnetic sheet ST. In this embodiment the recording tracks are formed concentrically, so that a delay circuit 16 delays a recording completion indicating signal produced from the gate control circuit 13 for a predetermined period of time which is, for example, sufficient for allowing the head moving mechanism 15 to move the head 9 by one track pitch of the magnetic sheet ST, after completion of each recording process.

First and second trigger switches SW1 and SW2 are closed by the operation of a trigger operation member 17 in the named order. First and second trigger circuits 181 and 182 produce trigger signals in response to closing of the first and second trigger switches SW1 and SW2, respectively. These elements jointly form trigger means for the camera. The first trigger circuit 181 latches the trigger signal output thereof in response to that of the second trigger circuit 182 and releases the latched signal output in response to a signal coming from the delay circuit 16. The second trigger circuit 182 latches the trigger signal output thereof when the second trigger switch SW2 closes. After that, the second trigger circuit 182 releases the latched output in response to a signal coming from the delay circuit 16. For this purpose, these trigger circuits 181, 182 are provided with, for example, flip-flop circuits.

A timer device 19 is arranged as timer means for a self-timer photography operation. Assuming that the waiting period for self-timer photography, i.e. a length of photography delaying time, is 10 sec. or thereabouts, the timer device 19 is provided with a first timer circuit (a longer time timer circuit) which controls a first predetermined length of time of about 8 or 9 sec and a second timer circuit 192 (a shorter time timer circuit), which controls the remaining length of time of about 1 or 2 sec. The length of time to be controlled by each of these timer circuits 191 and 192 is not limited to the above length. However, the period of time to be controlled by the second timer circuit 192 must be sufficiently long to allow the motor 10 to reach a normal stable rotating condition after it starts to rotate, that is, the time must be longer than the rise time of the motor 10. In this specific embodiment, each of the first and second timer circuits 191 and 192 is composed of an analog timer circuit which consists of, for example, a resistor, a capacitor, a transistor, a voltage comparator, etc.

Change-over switches SC1–SC6 are either manually or automatically operated for selection between a normal photography mode and a self-timer photography mode. Each of these change-over switches SC1–SC6 is set on one side "N" thereof under the normal photography mode and on the other side "T" under the self-timer photography mode. Accordingly, the first timer circuit 191 is rendered inoperative by the change-over switch SC1 in the normal photography mode. The first timer circuit 191 controls the above-stated first predetermined length of time in response to the trigger signal from the second timer circuit 192 in the self-timer photography mode. The second timer circuit 192 is kept inoperative by the change-over switch SC2 in the normal photography mode and controls the above-stated second predetermined length of time in the self-timer photography mode in response to a trigger signal which is produced from the first timer circuit 191 upon the lapse of the length of time under the control of the first timer circuit 191. The change-over switch SC3 is arranged so that the trigger signal which is produced from the first trigger circuit 181 in the normal photography mode and the trigger signal which is produced from the first timer circuit 191 upon the lapse of the controlled length of time are selectively supplied as operation instructing control signals to the synchronizing signal generating circuit 14, the image pick-up element driving circuit 3, the diaphragm control circuit 4 and the motor driving circuit 11. The change-over switch SC4 is arranged so that the trigger signal which is produced from the first trigger circuit 181 in the normal photography mode and a signal which is produced from an AND circuit 20, as will be described later, are selectively supplied as operation instructing control signals to the image signal processing circuit 6 and the recording circuit 7.

The AND circuit 20 receives the trigger signal produced from the second trigger circuit 182 and the trigger signal which is produced from the second timer circuit 192 upon the lapse of the above predetermined controlled length of time. The output signal of the AND circuit 20 is applied to the gate control circuit 13 as a recording instruction signal and is also applied to a terminal "T" of the change-over switch SC4 as an operation instructing signal for the image signal processing circuit 6 and the recording circuit 7.

A first voltage generating circuit 21 produces a first predetermined voltage V1 upon receipt of the trigger signal from the second trigger circuit 182 via the change-over switch SC5 in the self-timer photography mode. A second voltage generating circuit 22 produces a second predetermined voltage V2 upon receipt of the trigger signal produced from the second timer circuit 192 via the change-over switch SC6 after the lapse of the length of time under the control thereof in the normal photography mode and also produces the second predetermined voltage V2 upon receipt of the trigger signal which is produced from the first timer circuit 191 via the change-over switch SC6 after the lapse of the length of time under the control thereof in the self-timer photography mode. A voltage addition circuit 23 adds up the voltages V1 and V2 produced from the first and second voltage generating circuits 21 and 22. A voltage-to-frequency conversion circuit 24 (hereinafter referred to as the v-f conversion circuit) generates clock pulses of a frequency corresponding to a voltage produced from the voltage addition circuit 23. An LED 25 is employed as a status announcing light emitting element which flickers due to the pulses produced from the v-f conversion circuit 24 and is disposed in a suitable position on the camera body observable by persons to be photographed, preferably at the front of the camera body. A light guide member 26, which is made from a bundle of optical fiber or the like, guides the flickering light of the LED 25 to a place in the vicinity of a view finder field frame FL where the flickering light is observable through the view finder.

In this embodiment, the voltage V1 produced from the above-stated first voltage generating circuit 21 is set, for example, at a value at which the frequency of the driving pulses to be applied to the LED 25 from the v-f conversion circuit 24 becomes several Hz (2–3 Hz) and causes the LED 25 to flicker at several Hz. On the other hand, the voltage V2 produced from the second voltage generating circuit 22 is set, for example, at a value at which the frequency of the driving pulses to be applied to the LED 25 from the v-f conversion circuit 24 becomes several ten to several hundred Hz, causing the LED 25 to flicker at a frequency which appears to the human eye to be continuously lit. These elements 21–25 jointly form annunciating means which makes an announcement or display corresponding to the controlling status of the various devices, which changes as the photography delaying time elapses in the self-timer photography mode.

The video recording camera, which is arranged as described in the foregoing, performs photography operations as described below:

(1) Operation in the Normal Photography Mode:

In the normal photography mode, all the change-over switches SC1–SC6 are set on their sides "N". Under this condition, when the trigger operation member 17 is first operated to close the first trigger switch SW1, the first trigger circuit 181 produces a trigger signal in response. This signal is then supplied as an operation instructing control signal via the change-over switch SC3 to the synchronizing signal generating circuit 14, the image pick-up element driving circuit 3, the diaphragm control circuit 4 and the motor control circuit 11, respectively. Furthermore, this signal is also supplied as an operation instructing control signal to the image signal processing circuit 6 and the recording circuit 7 via another change-over switch SC4 and to the second timer circuit 192 of the timer device 19 via the change-over switch SC2. The synchronizing signal generating circuit 14 then begins to generate various synchronizing signals. The image pick-up element driving circuit 3 begins to drive the image pick-up element 2. The diaphragm control circuit 4 begins to control the diaphragm device 5 on the basis of the brightness component of the image signal obtained from the image pick-up element 2. The image signal processing circuit 6 and the recording circuit 7 respectively begin to process the image signal obtained from the image pick-up element 2 and to convert it into a recording signal. The motor control circuit 11 begins to drive the motor 10 to rotate the magnetic sheet ST. The second timer circuit 192 then controls the above-stated predetermined length of time.

Next, when the second trigger switch SW2 is closed with the trigger operation member 17 operated further, the second trigger circuit 182 produces a trigger signal in response [to that]. At that instant, if the length of time controlled by the second timer circuit 192 has already elapsed, the trigger signal produced from the second timer circuit 192 causes the AND circuit 20 to produce and supply a recording instruction signal to the gate control circuit 13. If the length of time under the control of the second timer circuit 192 has not yet elapsed at that time, the trigger signal causes the recording instruction signal to be supplied from the AND circuit 20 to the gate control circuit 13 upon the lapse of the controlled time. In response to this recording instruction signal, the gate control circuit 13 causes the recording gate 8 to perform, on the basis of the horizontal and vertical synchronizing signals received from the synchronizing signal generating circuit 14, a gate action on the field or frame portion of a video signal out of the signal output of the recording circuit 7. The one field or frame portion of the video signal thus allowed to pass the recording gate 8 is then recorded by the magnetic head 9 on the magnetic sheet ST. The head shifting device 15 then shifts the head 9 a predetermined extent in the radial direction of the magnetic sheet ST in response to a signal produced from the gate control circuit 13, indicating that the recording operation has ended or is still in process. Furthermore, at a point of time which is a suitable length of time after termination of recording, the output of the delay circuit 16 releases the first and second trigger circuits 181 and 182 from their latching states. Then, the camera stops operating.

Thus, every time the first and second trigger switches SW1 and SW2 are closed with the trigger operation member 17 operated, one field or frame portion of the video signal is recorded forming, on the magnetic sheet ST, one of the concentric or helical recording tracks.

In the operation described above, when the trigger signal is produced from the second timer circuit 192 after the lapse of a period of time under the control of the second timer circuit 192, the second voltage generating circuit 22 produces the predetermined voltage V2 in response to the trigger signal. This voltage V2 causes the v-f conversion circuit 24 to drive the LED 25 at a frequency of several ten to several hundred Hz. The light guide member 26 then makes the continuously lit up LED 25 observable within the view finder. This informs the operator that the camera has been duly prepared for recording and is now ready. In other words, the operator is informed of either the time at which recording can be carried out by further operating the trigger operation member 17 to close the second trigger switch SW2 or commencement of recording.

(2) Operation in Self-timer Photography Mode:

In the self-timer photography mode, all the change-over switches SC1–SC6 are set on their sides "T". When the first and second trigger switches SW1 and SW2 are closed by operating the trigger operation member 17 under this condition, the trigger signal which is produced from the second trigger circuit 182 in response to the closing of the second trigger switch SW2 first causes the first timer circuit 191 of the timer device 19 to begin to operate. Then, the first timer circuit 191 produces a trigger signal after the lapse of the predetermined first length of time. The trigger signal thus produced from the first timer circuit 191 is supplied via the change-over switch SC3 to the synchronizing signal generating circuit 14, the image pick-up element driving circuit 3, the diaphragm control circuit 4 and the motor control circuit 11 as an operation instructing control signal for them. Upon receipt of this signal, these circuits 14, 3, 4 and 11 respectively begin to operate. The trigger signal produced from the first timer circuit 191 is further supplied via another change-over switch SC2 to the second timer circuit 192. Upon receipt of the trigger signal, the second timer circuit 192 operates in place of the first timer circuit 191. After the lapse of the predetermined second time period, the second timer circuit 192 produces a trigger signal which acts as a recording instruction signal. In response to this signal, the AND circuit 20 produces the recording instruction signal, which is supplied via the change-over switch SC4 to the image signal processing circuit 6 and the recording circuit 7 to render them operative. Furthermore, the recording instruction signal is also supplied to the gate control circuit 13. Upon receipt of the signal, the gate control circuit 13 controls the recording gate 8, recording one field or frame portion of the video signal on the magnetic sheet ST by the magnetic head 9.

In the operation described above, a trigger signal is produced from the second trigger circuit 182 in response to closing of the second trigger switch SW2. When this trigger signal causes the first timer circuit 191 to begin to operate, the first voltage generating circuit 21 receives the trigger signal via the change-over switch SC5 and produces the predetermined voltage V1. This causes the v-f conversion circuit 24 to drive the LED 25 with a frequency of several Hz corresponding to the voltage VI. After the lapse of the length of time under the control of the first timer circuit 191, the first timer circuit 191 produces a trigger signal. While the second timer circuit 192 begins to operate in response to the trigger signal, the trigger signal is also supplied via the change-over switch SC6 to the second voltage generating circuit 22 causing it to produce the predetermined voltage V2. The voltage V2 then causes the output voltage of the voltage addition circuit 23 to become a Value V1+V2. Therefore, the v-f conversion circuit 24 drives the LED 25 with a frequency of several ten to several hundred Hz corresponding to the voltage V1+ V2. In the self-timer photography mode, therefore, the LED 25 flickers until the end of the length of time which is under the control of the first timer circuit 191. This brings about an announcement or display in the first mode and thereafter the LED 25 substantially continuously lights up to make the announcement or display in the second mode. The change in the display mode of the LED 25 effectively informs the persons to be photographed of the lapse of the waiting time or photography delaying time.

As described in the foregoing, in the operation of this embodiment in the self-timer photography mode, elements that require a relatively long rise time such as the sheet driving motor 10 or, in some cases, the exposure control system (4 and 5) are allowed to reach a normal operating condition by starting their operation somewhat earlier than the commencement of actual recording. Other elements that do not require or only require a small rise time allowance begin to operate at the commencement of actual recording, so that adequate video recording can always be accomplished with low power consumption. It is another advantage of the embodiment that a display is made through the LED 25 in a manner which varies with the control condition of the above various devices which varies as the photography delaying time passes away. In other words, the status of the camera immediately before recording is displayed in a different manner from the display of the prior lapsing status of the waiting time. This display differentiating arrangement is quite convenient to persons being photographed.

Furthermore, in this embodiment, the second timer circuit 192 of the timer device 19 is actuated by the trigger signal coming from the first trigger circuit 181 even in the normal photography mode. This arrangement enables the elements which require the above rise time to reach their normal operating conditions before unfailing recording, even if the second trigger switch SW2 happens to be closed immediately after the first trigger switch SW1 is closed by operation of the trigger operation member 17 in the normal photography mode, that is, even when the second trigger switch SW2 is closed before these elements reach the normal operating condition. Therefore, adequate video recording can always also be accomplished in the normal photography mode. It is a great advantage of the embodiment that a part of the timer device 19 which is provided for self-timer photography is also used for normal photography as mentioned above. It is a further great advantage of the embodiment that upon the lapse of the length of time which is under the control of the second timer circuit 192, the substantially continuous lit up state of the LED 25 is observable through the view finder by the light guide member 26, so that completion of preparation for recording can be found through the view finder. Furthermore, it is also a great advantage of the embodiment in terms of structural arrangement that the same annunciating means 21–25 shows the lapsing status of the photography delaying time in the self-timer photography mode as well as showing the completion of preparation for recording in the normal photography mode.

The timer device 19 included in the above-stated embodiment is composed of analog timer circuits. However, the analog timer circuits may be replaced with a digital circuit arrangement. An example of such a circuit arrangement is shown in FIG. 2.

Figure 2:
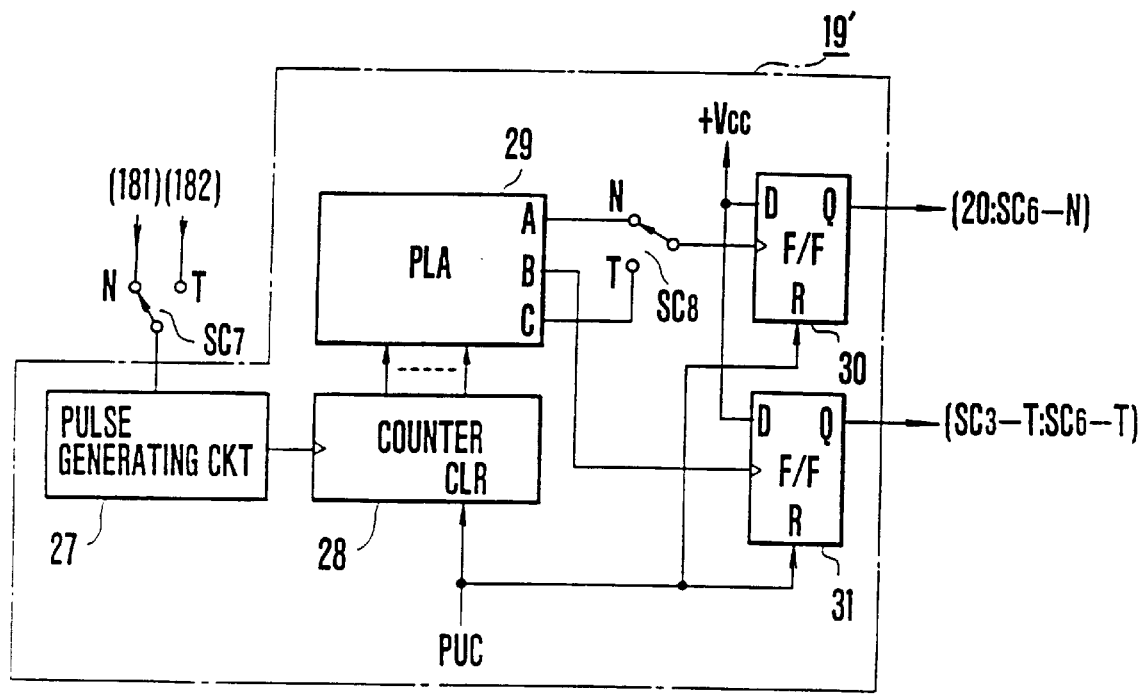
FIG. 2 is a circuit diagram showing another example of the arrangement of a timer device included in the camera shown in FIG. 1.

Referring to FIG. 2, a reference numeral 19' identifies the whole of a timer device replacing the timer device 19 of FIG. 1. Change-over switches SC7 and SC8 are shifted to one side "N" in the normal photography mode and to the other side "T" in the self-timer photography mode in the same manner as the change-over switches SC1–SC6 of FIG. 1. A pulse generating circuit 27 produces clock pulses of a predetermined frequency in response to the trigger signal from the first trigger circuit 181 of FIG. 1 in the normal photography mode and in response to the trigger signal from the second trigger circuit 182 of FIG. 1 in the self-timer photography mode. A counter 28 counts the pulses produced from the pulse signal generating circuit 27. Reference numeral 29 identifies a programmable logic array (hereinafter referred to as PLA) which is arranged as follows: After the counter 28 begins to count the pulses, the PLA produces, from an output terminal A, a pulse signal when the counter 28 has counted a predetermined number of pulses of the pulse signal corresponding to a sufficient period of time for allowing the above-stated various elements requiring rise time, such as the sheet rotating motor 10 of FIG. 1 or, in some cases, the exposure control system (4 and 5) to reach their normal operating state after they are triggered by the first trigger circuit 181; The PLA produces, from an output terminal B, a pulse signal when the counter 28 has counted a predetermined number of pulses corresponding to a predetermined first length of time in the self-timer photography mode (corresponding to the length of time under the control of the first timer circuit 191 of FIG. 1); The PLA also produces, from another output terminal C, another pulse signal when the counter 28 has counted a number of pulses corresponding to the sum of the first and second lengths of time in the self-timer photography mode (i.e. corresponding to the sum of the lengths of time under the control of the first and second timer circuits 191 and 192 of FIG. 1). A D-type flip-flop 30 is triggered by the pulse signal produced from the output terminal A of the PLA 29 in the normal photography mode and is triggered by the pulse signal from the output terminal C of the PLA 29 in the self-timer photography mode. Another D-type flip-flop 31 is triggered by the pulse signal produced from the output terminal B of the PIA 29. These flip-flops 30 and 31 and the counter 28 are reset or cleared by means of a power-up-clear signal PUC which is obtained through some suitable means when the first trigger switch SW1 of FIG. 1 is closed. Furthermore, an input terminal D of each of these flip-flops 30–31 is set at a predetermined high level potential. In this instance, in place of the output of the second timer circuit 192 of FIG. 1, an output terminal Q of the flip-flop 30 is connected to one of the input terminals of the AND circuit 20 of FIG. 1 and to the terminal "N" of the change-over switch SC6 of FIG. 1. Furthermore, an output terminal Q of the flip-flop 31 is connected, in place of the output terminal of the first timer circuit 191, to the terminals "T" of the change-over switches SC3 and SC6.

In the normal photography mode, the arrangement described above operates as follows; Both the change-over switches SC7 and SC8 are connected to their terminals "N". Accordingly, in response to closing of the first trigger switch SW1 with the trigger operation member 17 of FIG. 1 operated, the first trigger circuit 181 produces a trigger signal. In response to this trigger signal, the pulse generating circuit 27 begins to produce pulses. The counter 28 begins to count the pulses. When the counter 28 has counted a predetermined number of pulses corresponding to a sufficient period of time for allowing the elements which require a relatively long rise time to reach their normal operating state, the PLA 29 produces a pulse from the output terminal A thereof. This pulse triggers the flip-flop 30 to make the level of the output Q high. The high level output Q in turn causes the level of one of the inputs of the AND circuit 20 and that of the terminal "N" of the change-over switch SC6 to become high. Then, the operation of this embodiment is the same as the operation of the preceding embodiment performed with a trigger signal produced from the second timer circuit 192 after the lapse of the length of time under the control thereof in the normal photography mode.

In the self-timer photography mode, both the change-over switches SC7 and SC8 are connected to their terminals "T". With the trigger operation member 17 of FIG. 1 operated, the second trigger switch SW2 closes. In response to this, the second trigger circuit 182 produces a trigger signal. The trigger signal causes the pulse generating circuit 27 to begin to produce the pulse signal. The counter 28 begins to count the pulses thus produced. With the count proceeding, when a predetermined number of pulses corresponding to the above-stated predetermined first period of time is counted, the PLA 29 produces a pulse from the output terminal B thereof. The pulse triggers the flip-flop 31, making the level of its output Q high. Accordingly, the levels of the terminals "T" of the changeover switches SC3 and SC6 of FIG. 1 become high. Following that, when the counter 28 counts a predetermined number of pulses corresponding to the above-stated sum of the predetermined first and second periods of time, the PLA 29 produces a pulse from the output terminal C to trigger thereby the flip-flop 30. The level of the output Q of the flip-flop 30 then becomes high. At this point of time, therefore, the AND circuit 20 of FIG. 1 produces the recording instruction signal. Then, the operation of this embodiment is the same as the operation of the preceding embodiment wherein the first and second timer circuits 191 and 192 produce trigger signals upon the lapse of the lengths of time which are under their control in the self-timer photography mode.

In the embodiment shown in FIG. 1, the LED 25 is arranged as the annunciating means to make an optical display. However, in accordance with the invention, this arrangement of the LED 25 of course, may be replaced with some audible annunciation arrangement using some sound emitting element instead of the LED 25. An example of such an arrangement is shown in FIG. 3.

Figure 3:
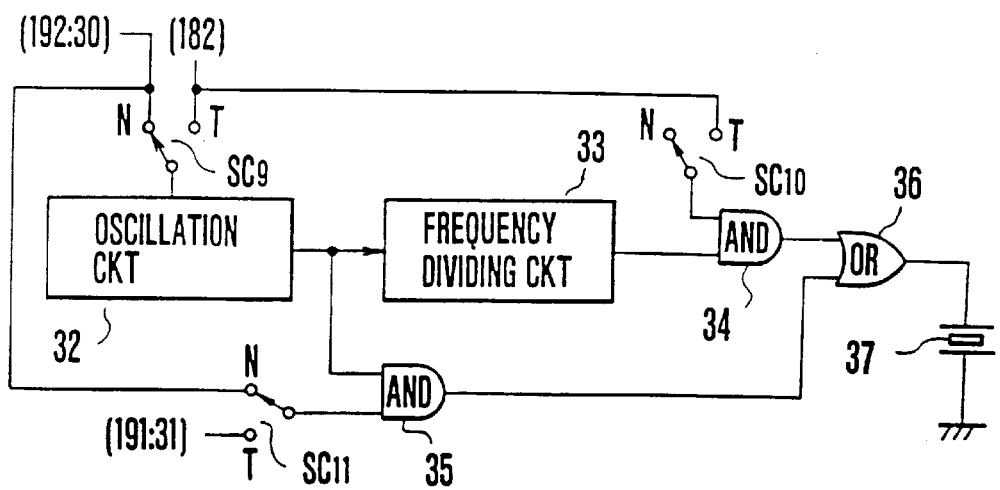
FIG. 3 is a circuit diagram showing another example of the arrangement of annunciating means included in the camera shown in FIG. 1.

Referring to FIG. 3, reference symbols SC9, SC10 and SC11 denote change-over switches, each of which is shiftable to one side "N" for the normal photography mode and to the other side "T" for the self-timer photography mode in the same manner as the change-over switches SC1–SC8 of FIGS. 1 and 2. An oscillation circuit 32 causes a sound emitting element 37, which will be described later, to generate an audible sound in response to the output of the second timer circuit 192 of FIG. 1 or the output Q of the flip-flop 30 of FIG. 2 in the normal photography mode or in response to the trigger signal from the second trigger circuit 182 in the self-timer photography mode based on the shifting operation of the change-over switch SC9 by producing driving pulses of a predetermined frequency, say, between several hundred Hz and 1 KHz. A frequency dividing circuit 33 frequency divides the pulse output of the oscillation circuit 32 and produces a pulse output of several Hz, or 2 to 3 Hz. An AND circuit 34 is caused by the shifting operation of the change-over switch SC1 to pass the pulse output of the frequency dividing circuit 33 in response to the trigger signal from the second trigger circuit 182 only in the self-timer photography mode. Another AND circuit 35 is caused by the shifting operation of the change-over switch SC11 to pass the pulse output of the oscillation circuit 32 in response to the output of the second timer circuit 192 of FIG. 1 or the output Q of the flip-flop 30 of FIG. 2 in the normal photography mode or in response to the output of the first timer circuit 191 of FIG. 1 or that of the flip-flop 31 of FIG. 2 in the self-timer photography mode. An OR circuit 36 receives the outputs of the AND circuits 34 and 35. A piezo-electric buzzer 37 serves as an annunciating sound emitting element and omits sound by driving pulses applied thereto via the OR circuit 36.

In the arrangement described above, all the change-over switches SC9–SC11 are set on their sides "N" in the normal photography mode. In the normal photography mode, therefore, the oscillation circuit 32 begins to produce a driving pulse output and the AND circuit 35 passes the driving pulse output when either the second timer circuit 192 of FIG. 1 produces the trigger signal or the level of the output Q of the flip-flop 30 of FIG. 2 becomes high. The driving pulses thus passed are applied via the OR circuit 36 to the piezo-electric buzzer 37. This causes the buzzer 37 to continuously emit a sound informing the operator of completion of preparation for video recording or commencement thereof.

In the case of the self-timer photography mode, all the change-over switches SC9–SC11 are set on their sides "T". When the trigger signal is produced from the second trigger circuit 182, the oscillation circuit 32 begins to produce the driving pulses. The AND circuit 34 then passes the output of the frequency dividing circuit 33. The output of the frequency dividing circuit 33 is thus applied via the OR circuit 36 to the piezo-electric buzzer 37. The buzzer 37 intermittently emits a sound based on the frequency of the pulse output of the frequency dividing circuit 33. In other words, the buzzer 37 makes an announcement in a first mode. Following this, when either the trigger signal is produced from the first timer circuit 191 of FIG. 1 or the level of the output Q of the flip-flop 31 of FIG. 2 becomes high after the lapse of the above-stated first controlled length of time, the AND circuit 35 allows the pulse output of the oscillation circuit 32 to pass. This causes the buzzer 37 to continuously emit a sound in a second mode of announcement. The buzzer 37 thus announces the lapsing statuses of the above-stated first and second controlled lengths of time with the intermittent sound and the continuous sound.

In the embodiment described above, the frequency dividing circuit 33 is preferably arranged to produce the pulse output thereof at a frequency of 1 Hz. This arrangement is quite convenient as the number of sound emission times then comes to inform the operator of the lapsing status of time in second.

In the embodiment described in the foregoing, the invention is applied by way of example to a magnetic still video recording camera. The recording method of the camera, however, may be replaced with a photo-electric or electrostatic capacity type method. Further, the invention is applicable also to a video recording camera of the kind arranged to record a video signal with one or more rotary magnetic heads on a magnetic tape as in the case of a known video cassette recorder (VCR). In that case, such an element that requires a relatively long rise time, such as driving means for rotating the magnetic head, driving means for driving a magnetic tape moving member (or a capstan, for example), an exposure control system or the like is arranged to be triggered, in the event of the self-timer photographing mode, either by the trigger signal from the first timer circuit 191 of FIG. 1, for example, via the terminal "T" of the change-over switch SC3 or by the output Q of the flip-flop 31 of FIG. 2, for example, via the terminal "T" of the change-over switch SC3.

In accordance with an aspect of this invention, as described in detail in the foregoing, a video recording camera of the kind having a self-timer device is arranged to ensure that, in the self-timer photographing mode, the element requiring a relatively long rise time reaches a normal operating state at the time of recording by allowing it to begin to operate a little earlier than commencement of recording. The invented arrangement is extremely advantageous for a video camera of this kind as it enables the camera to perform apposite video recording always at a low rate of power consumption.

In accordance with another aspect of the invention, the video recording camera of the kind having a self-timer device is arranged to ensure that, in the self-timer photographing mode, the element requiring a relatively long rise time reaches a normal operating state thereof at the time of recording by allowing it to begin to operate a little earlier than commencement of recording so that apposite video recording can be performed at a low rate of power consumption; and that, in this instance, the operator is clearly informed of the time of commencement of recording in advance by an annunciation or announcement made in a manner which varies with the controlled status of a photographing delaying time. Therefore, the invention is extremely advantageous for a video camera of this kind.

What is claimed is:

1. A recording apparatus having a self-timer recording mode for recording an image signal on a recording medium, comprising:

a) image pick-up means for picking up an image of an object, and outputting an image signal corresponding to the picked-up image;

b) recording means provided with a recording head for recording on said recording medium said image signal outputted from said image pick-up means with said recording head;

c) drive means for driving said recording medium relative to said recording head at a speed required for recording;

d) recording mode setting means for setting an operation mode of said apparatus to the self-timer recording mode for a previously set period of time;

e) time-counting means for counting time when the operation mode of said apparatus is set to the self-timer recording mode to provide an elapsed period of time and generating an indicating signal when said elapsed period of time substantially equals said set period of time; and f) control means for controlling said drive means and said recording means, in response to the generation of said indicating signal by said time-counting means, so as to cause said drive means to start driving said recording medium relative to said recording head at a speed below said speed required for recording and thereafter to cause said recording means to start recording on said recording medium said image signal outputted from said image pick-up means with said recording head when said recording medium is driven at said speed required for recording.

2. An apparatus according to claim 1, which further comprises means for informing progress of the time counting by said time-counting means.

3. An apparatus according to claim 1, where said recording medium is a disk-like recording medium.

4. An apparatus according to claim 3, wherein said drive means includes a motor which rotates said recording medium, said control means starts the rotation of said recording medium by said motor so to rotate at said speed below said speed required for recording in response to said indicating signal and when said recording medium rotates at said speed required for recording said control means starts the recording on said recording medium said image signal outputted from said image pick-up means with said recording read.

* * * * *